United States Patent
Lau

(10) Patent No.: US 7,369,655 B2
(45) Date of Patent: May 6, 2008

(54) TELEPHONE HANDSET UNIVERSAL CONNECTOR

(75) Inventor: Kong Ping Lau, Hong Kong (CN)

(73) Assignee: Intelli Innovations Ltd., Kwun Tong (HK)

( * ) Notice: Subject to any disclaimer, the term of this patent is extended or adjusted under 35 U.S.C. 154(b) by 884 days.

(21) Appl. No.: 10/848,545

(22) Filed: May 17, 2004

(65) Prior Publication Data

US 2005/0254642 A1    Nov. 17, 2005

(51) Int. Cl.
*H04M 1/00*    (2006.01)
*H04M 9/00*    (2006.01)

(52) U.S. Cl. .............................. 379/433.05; 379/433.01

(58) Field of Classification Search ................................
379/433.01–433.03, 433.05, 438, 399.01,
379/442; 455/557; 439/344, 660, 676, 677
See application file for complete search history.

(56) References Cited

U.S. PATENT DOCUMENTS 5,784,456 A * 7/1998 Carey et al. ................. 379/419
6,222,910 B1 * 4/2001 Price et al. ............... 379/93.37
6,256,519 B1 * 7/2001 Newton ...................... 455/572
6,381,308 B1 * 4/2002 Cargo et al. .................. 379/52
6,697,464 B1 * 2/2004 Nelson et al. ........... 379/93.05
7,162,028 B2 * 1/2007 Lieder et al. .......... 379/399.01

* cited by examiner

*Primary Examiner*—Curtis Kuntz
*Assistant Examiner*—Tuan D Nguyen
(74) *Attorney, Agent, or Firm*—Raymond Y. Chan; David and Raymond Patent Firm

(57) ABSTRACT

A telephone handset universal connector is used to connect between a phone base having a set of four signal outlets, and a handset having a set of four corresponding signal ports. The telephone handset universal connector includes a universal circuitry and a selection switch. The universal circuitry has an electric output 101 for electrically connecting with the four signal outlets of the phone base and an electric output 102 for electrically connecting with the four signal ports of the handset, wherein the selection circuitry provides twelve connection combinations for selectively connecting between the four signal outlets and the four signal ports. The selection switch is electrically connected with the selection circuitry to selectively switch the selection circuitry within the twelve connection combinations.

20 Claims, 5 Drawing Sheets

TELEPHONE HANDSET UNIVERSAL CONNECTOR

BACKGROUND OF THE PRESENT INVENTION

1. Field of Invention

The present invention relates to a telephone, and more particularly to a telephone handset universal connector which allows a phone base connecting to a handset in twelve different combinations so as to universalize any handset for use with any phone base.

2. Description of Related Arts

A conventional telephone comprises a phone base and a handset comprising a microphone and a speaker, wherein the phone base is electrically connected with the handset via four connection wires in such a manner that audio signal may be transferred between the phone base and the speaker.

Typically, the phone base comprises four signal ports and the handset comprises four signal outlets wherein the four connection wires are electrically connected between the four signal ports with the four signal outlets respectively. Among the four signal outlets, two of which are connected with the speaker and the remaining two are connected with the microphone. As a matter of conventional art, those two connection wires which are connected with the microphone should be polarized in a predetermined manner such that a correct polarity of electrical signal is inputted to the appropriate signal outlet for driving the microphone to operate. In other words, the positive signal inlet must be connected with the positive signal port, whereas the negative signal inlet must be connected to the negative signal port.

On the other hand, those two connection wires which are connected with the speaker needs not polarizing for the speaker to operate. In other words, irrespective of where the two signal outlet connected to, whether a positive or a negative signal ports on the phone base, the speaker may still operate.

A disadvantage of this kind of conventional telephone is that there is no standard way to connect the connection wires with the signal outlets and the signal ports. As a result, it is up to the manufacturer to determine, perhaps for the sake of technical convenience, which connection wire is to connect which signal port with which signal outlet and their corresponding connection combination.

It is important to point out that this disadvantage causes little problem per se, for a phone base is usually accompanied by a corresponding handset in which all the wire connections are predetermined in a particular manner so that there is no operational difficulty. However, problem arises when one is trying to connect an adjunct amplifier or other electronic devices between the phone body and the headset. In such cases, the polarity of the connection wires may be changed by the additional electronic devices so that the handset becomes inactive.

In other words, the telephone is not equipped to add on other electronic devices not because of substantive incompatibility, but simply for unmatched polarity of the telephone wire between the phone body and the handset. Once the connection combination is set, it cannot be adjusted and as a result, become too inflexible to widen add on applications.

SUMMARY OF THE PRESENT INVENTION

A main object of the present invention is to provide a telephone handset universal connector which allows a phone base connecting to a handset in twelve different combinations so as to universalize any handset for use with any phone base in a selectable manner.

Another object of the present invention is to provide a telephone handset universal connector which enhances the compatibility of conventional telephone to other electronic devices by maintaining a compatibility between the phone base and the handset while the additional electronic device is incorporated thereto.

Another object of the present invention is to provide a telephone handset universal connector for a telephone which does not alter the original design and structure thereof so that the present invention may be used in conjunction with any typical conventional telephones.

Another object of the present invention is to provide a telephone handset universal connector which does not involve any complicated and expensive electronic or mechanical components so as to minimize the manufacturing cost and the ultimately selling price of the present invention.

Accordingly, in order to accomplish the above objects, the present invention provides a telephone handset universal connector for connecting between a phone base having a set of four signal outlets, and a handset having a set of four corresponding signal ports, wherein the telephone handset universal connector comprises:

a universal circuitry having an electric output 101 for electrically connecting with the four signal outlets of the phone base and an electric output 102 for electrically connecting with the four signal ports of the handset, wherein the selection circuitry provides twelve connection combinations for selectively connecting between the four signal outlets and the four signal ports; and a selection switch electrically connected with the selection circuitry to selectively switch the selection circuitry within the twelve connection combinations such that when the universal switch is switched at one of the connection combinations, the connection combination is arranged for correspondingly matching the four signal outlets with the four signal ports respectively so as to operatively connect the handset with the phone unit.

These and other objectives, features, and advantages of the present invention will become apparent from the following detailed description, the accompanying drawings, and the appended claims.

DETAILED DESCRIPTION OF THE PREFERRED EMBODIMENT

Figure 1:
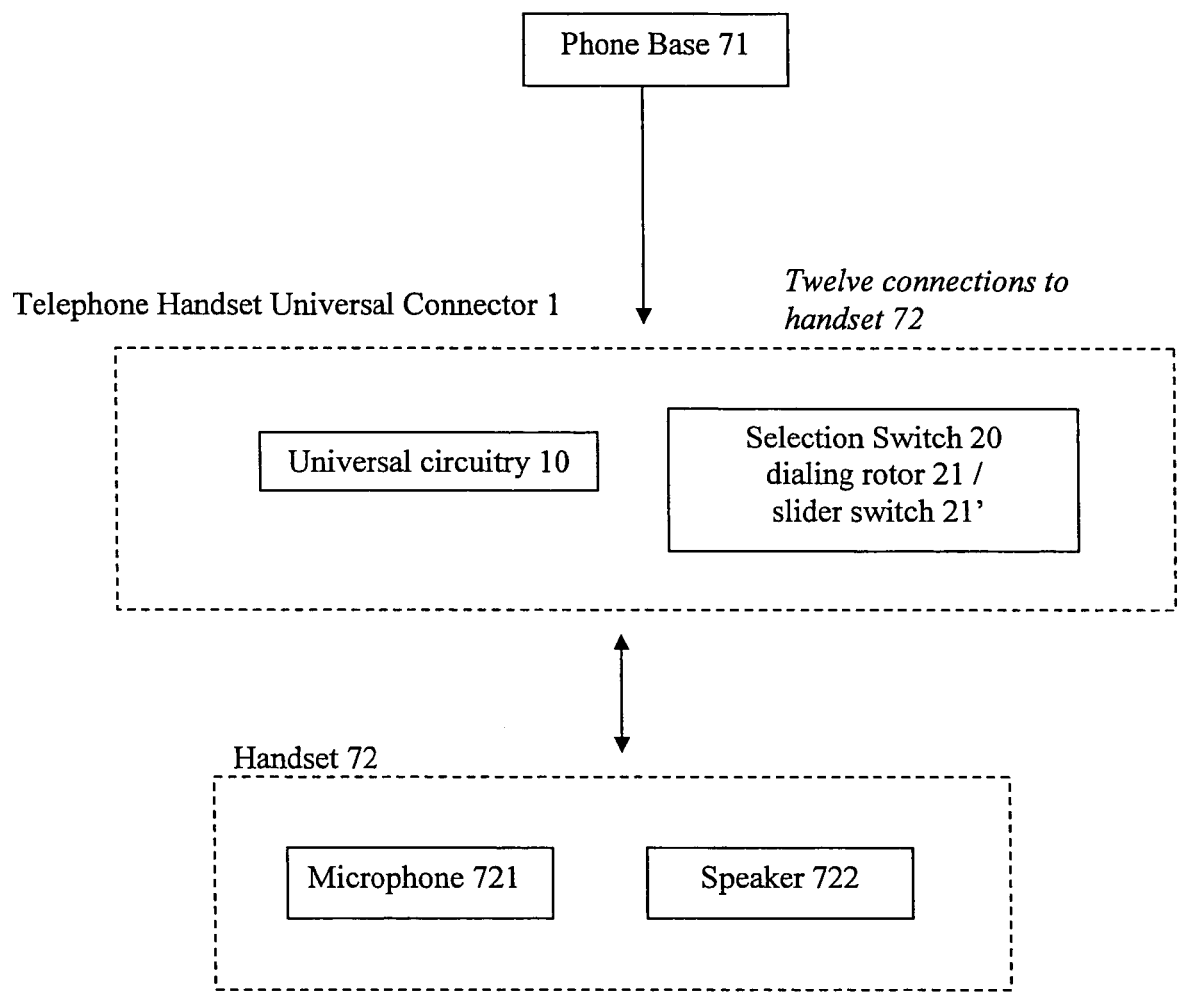
FIG. 1 is a schematic diagram of a telephone handset universal connector according to a preferred embodiment of the present invention.
Figure 4A:
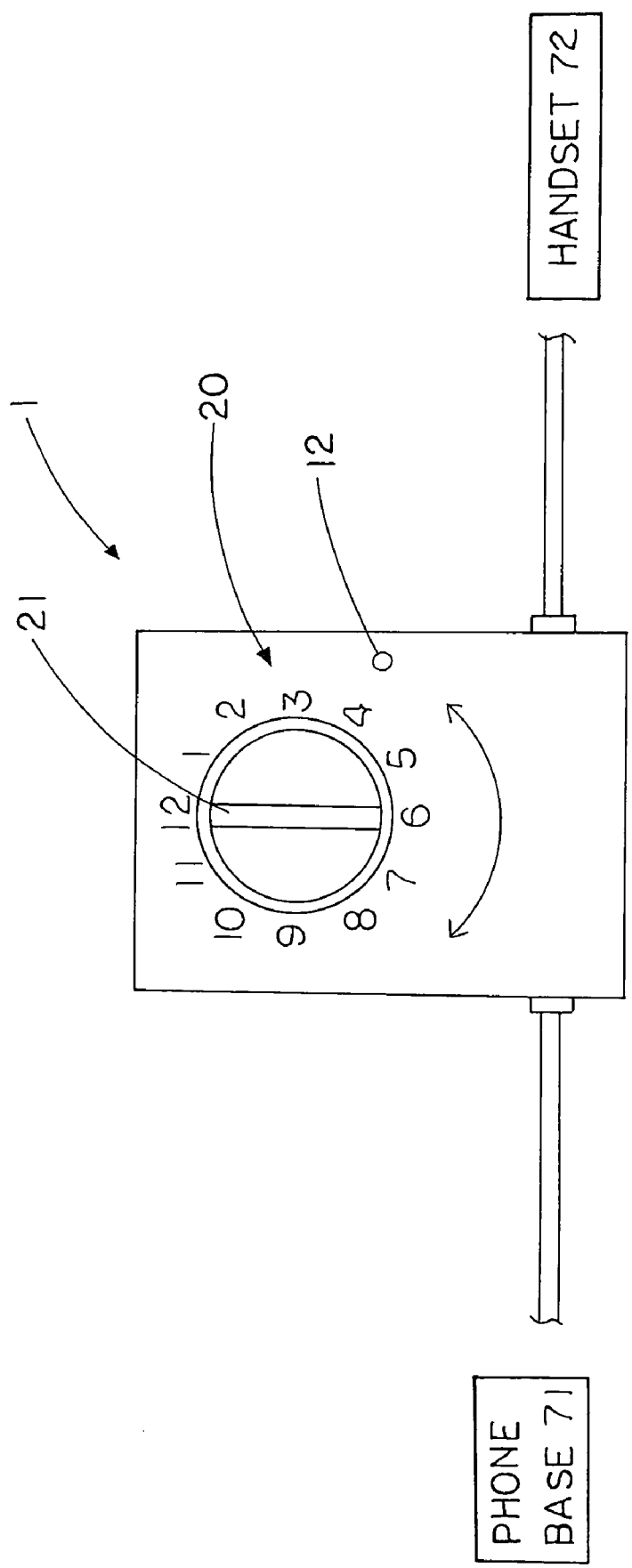
FIG. 4A is a perspective view of the telephone handset universal connector according to the above preferred embodiment of the present invention.

Referring to FIG. 1 and FIG. 4A of the drawings, a telephone handset universal connector 1 according to a preferred embodiment of the present invention is illustrated, in which it is utilized for connecting between a phone base 71 having a set of four signal outlets, and a handset 72 having a set of four corresponding signal. The telephone handset universal connector 1 comprises a universal circuitry 10 and a selection switch 20.

The universal circuitry 10 has an electric output 101 for electrically connecting with the four signal outlets of the phone base 71, and an electric output 102 for electrically connecting with the four signal ports of the handset 72, wherein the universal circuitry 10 provides twelve connection combinations for selectively connecting between the four signal outlets and the four signal ports.

The selection switch 20 is electrically connected with the universal circuitry 10 to selectively switch the universal circuitry 10 with the twelve connection combinations such that when the universal switch 20 is switch at one of the connection combinations, the connection combination is arranged for correspondingly matching the four signal outlets with the four signal ports respectively so as to operatively connect the handset 72 with the phone base 71.

The universal circuitry 10 comprises a polarity check circuit 11 electrically connected between the electric output 102 and the electric output 101 for ensuring the two microphone signal outlets to be connected with the two microphone signal ports in a polarizing manner at one of the terminal connections. Specifically, the polarity check circuit 11 has a polarity testing terminal and a ground terminal to determine an impedance between the electric output 101 and the electric output 102 for testing whether the two microphone signal outlets are polarizedly connected with the microphone signal ports.

According to the preferred embodiment, the four signal outlets of the phone base 71 form as a first and a second microphone signal outlets and a first and a second speaker signal outlets respectively, whereas the four signal ports of the handset 72 form a first and a second speaker signal ports and a first and a second microphone signal ports respectively. Accordingly, the handset 72 comprises a microphone 721 and a speaker 722 wherein the first and the second microphone signal ports are electrically connected with the microphone 721 so as to operate it. On the other hand, the first and the second speaker signal ports are electrically connected with the speaker so as to operate it.

As mentioned in the background, the microphone is polarity dependent in the sense that electrical signal sent to it should be polarized in a predetermined pattern so as to properly drive the microphone to operate. In other words, the first microphone signal port must be inputted with a positive signal while the second microphone signal must be inputted with a negative signal in order for the microphone to operate properly.

On the other hand however, the speaker 722 of the handset 70 is polarity-independent in the sense that whatever pole of the electrical signal is inputted to the first and the second speaker signal ports, the speaker would still operate properly.

Thus one skilled in the art would be easy to appreciate, by simple statistics theory, that there are altogether twelve different connection combinations, in terms of the polarity of the electrical signal transferring between the phone base 71 and the handset 72, between the four signal inlets and the four signal ports. As a result, the universal circuitry is adapted to selectively provide those twelve different connection combinations between the handset 72 and the phone base 71 via the four signal outlets and the four signal ports in such a manner that a user of the present invention can be able to select which connection combination should be used and check whether or not that connection combination is capable of operatively connecting the handset 72 and the phone base 71.

The operation principles of the polarity check circuit 11 is founded on the following basic rules:

(Situation I) the impedance of the speaker is normally below 200 Ω.

(Situation II) the impedance of the microphone in reversed polarity is normally below 50 Ω.

(Situation III) the impedance of the microphone in a correct polarity is normally around 1000 Ω or more (preferably 1000 Ω-2500 Ω).

Accordingly, from the above three basic situations, there are altogether four combinations of impedance between a polarity testing terminal 'M+' and a ground terminal 'GND' on the polarity check circuit 11. They are:

(i) the speaker is normally below 200 Ω;

(ii) microphone in reversed polarity which is below 50 Ω;

(iii) microphone in correct polarity which is around 1000 Ω; or (iv) either positive or negative (a common polarity) inputted to microphone and any polarity inputted to the speaker, in such a case, the impedance is greater than 1,000,000 Ω.

Figure 2:
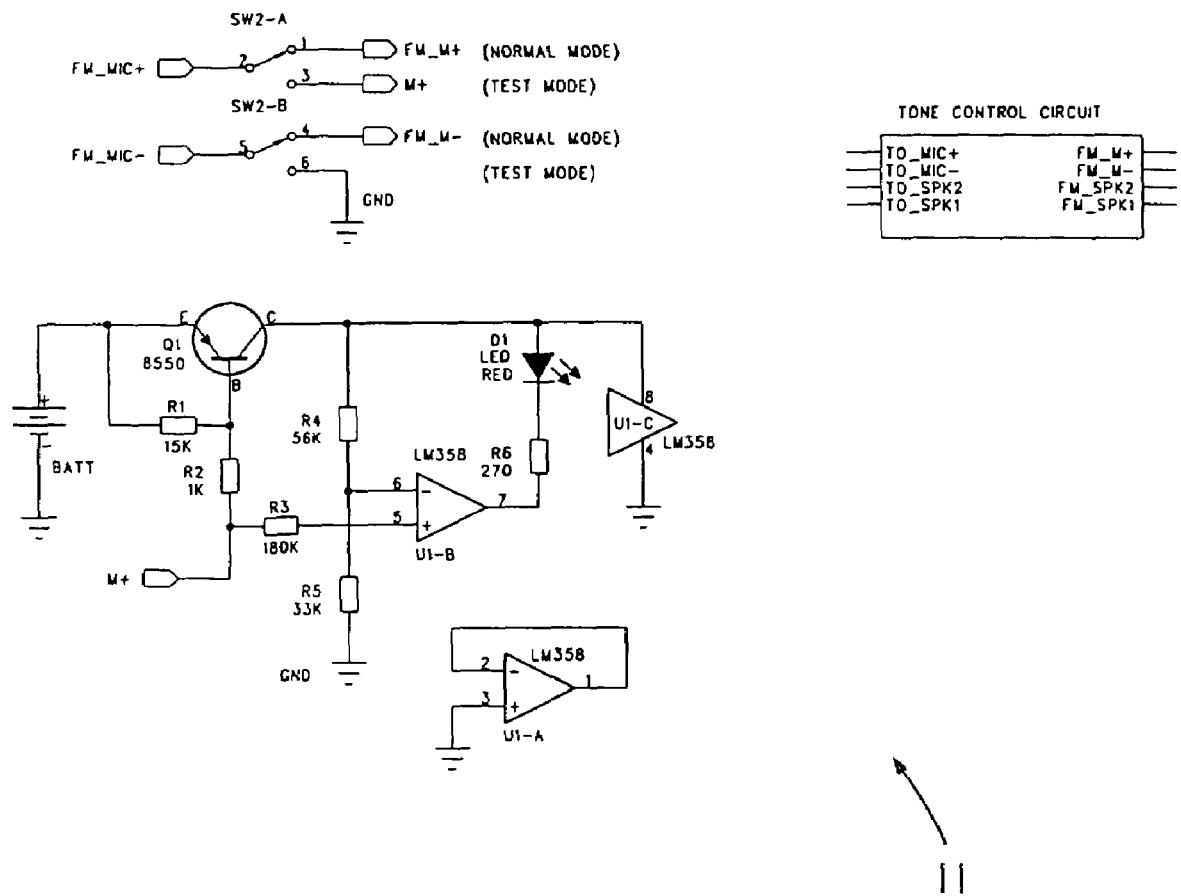
FIG. 2 is a circuit diagram of the universal circuitry according to the above preferred embodiment of the present invention.

Referring to FIG. 2 of the drawings, for condition (i), (ii) or (iii), the transistor Q1 would be turned on. Moreover, for condition either (i) or (ii) above the LED is turned off. And, for condition (iii) above, the LED would be turned on, signaling that the handset 72 and the phone base 71 is properly connected. On the contrary, for condition (iv) above, the LED would be turned off, signaling that the handset 72 and the phone base 71 is not properly connected.

According to the preferred embodiment, the selection switch 20 comprises a dialing rotor 21 rotatably provided thereon in such a manner that it is adapted to rotatably and discretionally move between twelve discrete positions to switch the universal circuitry 10 connecting the handset 72 with the phone base 71 in the above-mentioned twelve different connection combinations respectively. Therefore, when a proper connection is rotatably selected, the LED of the universal circuitry 10 would be turned on and the user is notified that the telephone is ready to use.

Figure 4B:
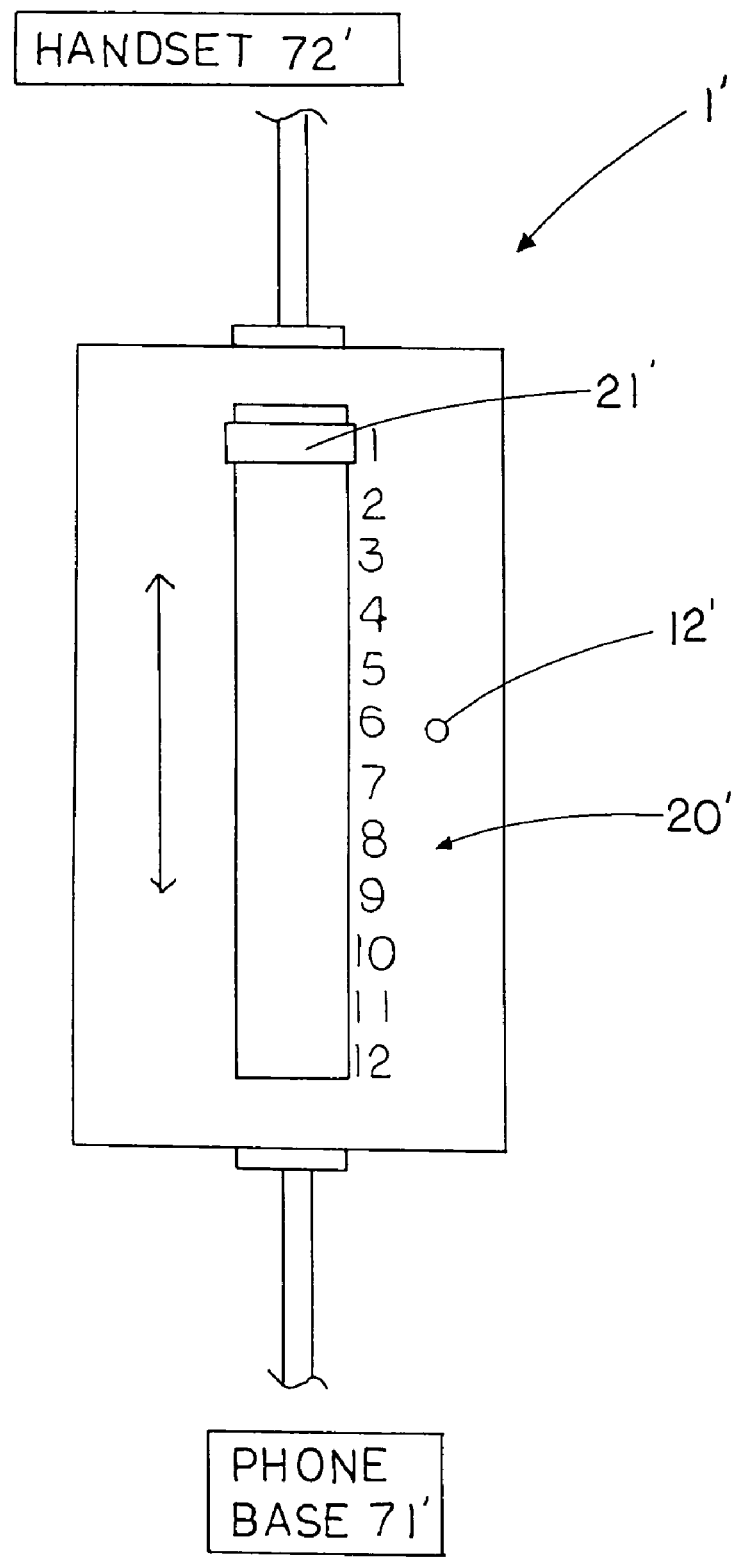
FIG. 4B is an alternative mode of the telephone handset universal connector according to the above preferred embodiment of the present invention.

Alternatively, as shown in FIG. 4B of the drawings, the selection switch 20' may comprises a silder switch 21' slidably provided thereon in such a manner that it is adapted to slidably and discretionally move between twelve discrete positions to switch the universal circuitry 10' connecting the handset 72' with the phone base 71' in the above-mentioned twelve different connection combinations respectively. Therefore, when a proper connection is slidably selected, the LED of the universal circuitry 10' would also be turned on and the user is notified that the telephone is ready to use.

It is worth mentioning that the telephone handset universal connector 1 of the present invention can be embodied as an add-on unit connected between the handset 72 and the phone body 71. In other words, the electric output 102 and the electric output 101 of the universal circuitry each comprises four connection sockets which are adapted to electrically connect with the signal inlets and the signal ports respectively.

Or alternatively, it may be incorporated into the phone body 71 or the handset 72 in which the selection switch 20 is incorporated in the phone body 71 or the handset 72 so that a user of the present invention may operate the switching operation on the phone body 71 or the handset 72 respectively.

Figure 3:
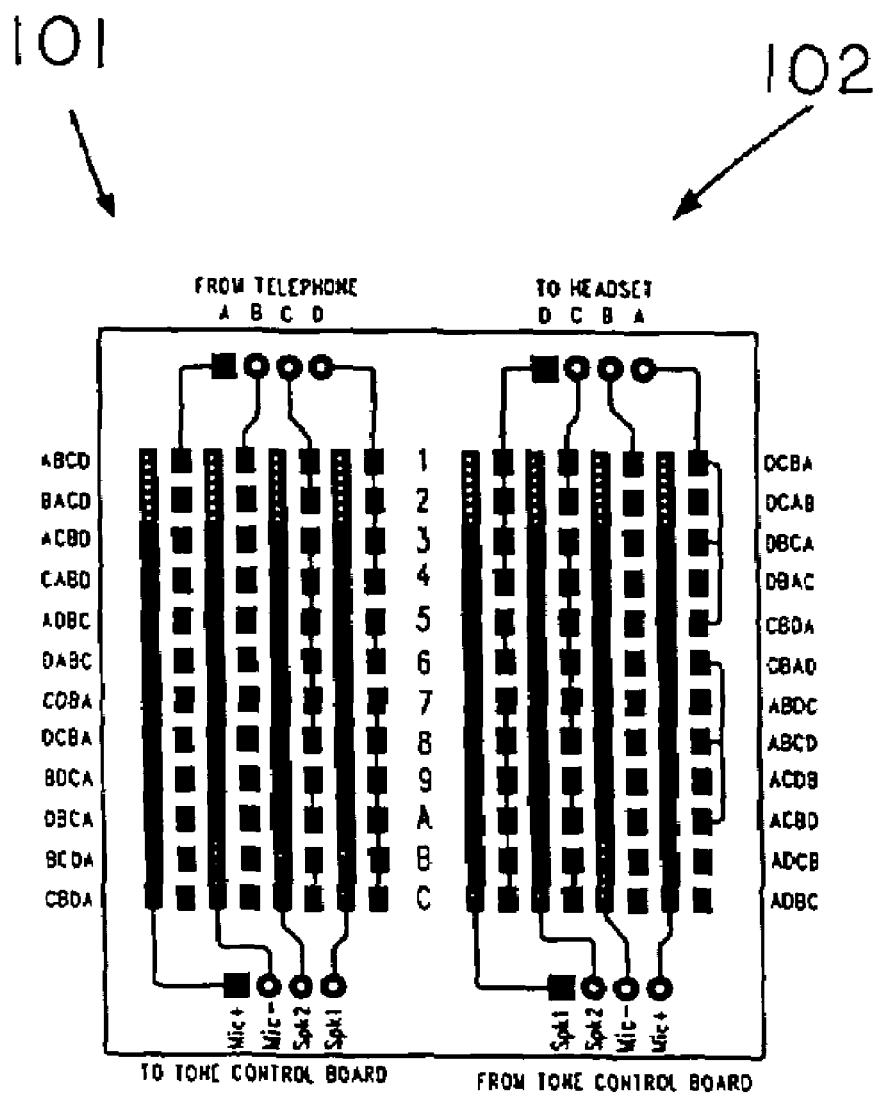
FIG. 3 is a schematic diagram of the universal circuitry according to the above preferred embodiment of the present invention, illustrating the twelve connection combination between the phone base and the handset.

Referring to FIG. 3 of the drawings, the twelve different connection combinations between the phone body 71 and the handset 72 are schematically illustrated. Originally, each of the four signal inlets are free to connect with any one of the signal ports. Thus, there are altogether 4!=24 connection combinations. However, since only the microphone signal ports are polarity dependent, so how the speaker signal ports are connected is essentially immaterial. Then, mathematically, the material connection combinations are reduced to a number of 3!=12, which are adapted to be selectable by the section switch 20 on the universal circuitry 10.

Thus, where the telephone handset universal connector 1 is an add-on unit, it may further comprise a portable housing 30 receiving the universal circuitry 10 therein, wherein said selection switch 20 is movably mounted on the portable housing 30 to discretionally move between the twelve discrete positions corresponding to the twelve connection combinations of the universal circuitry 10 to selectively and manually switch the universal circuitry at one of the terminal connections.

Specifically, the dialing rotor 21 may be rotatably mounted on the portable housing 30 to electrically connect with the universal circuitry 10 such that the dialing rotor is discretionally rotated between the discrete positions to switch the universal circuitry 10 between the above-mentioned terminal connections.

Yet another alternative mode is that the slider switch 21' is slidably mounted on the portable housing 30 to electrically connect with the universal circuitry such that the slider switch is discretionally slid between the discrete positions to switch the universal circuitry 10 between the above-mentioned terminal connections.

Referring to FIG. 1 to FIG. 2 of the drawings, the universal circuitry 10 further comprises a circuit indicator 12 electrically connected with the polarity check circuit 11 for generating an indicating signal when the two microphone signal outlets are correspondingly connected with the two microphone signal ports and the two speaker signal outlets are correspondingly connected with the two speaker signal ports at the terminal connection. According to the preferred embodiment, the circuit indicator 12 comprises a LED electrically built-in with said polarity check circuit 11 for generating a light effect as the above-mentioned indicating signal.

Alternatively, the circuit indicator 12 may also comprise a sound generator electrically built-in with said polarity check circuit 11 for generating a sound effect as said indicating signal.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A telephone handset universal connector for connecting between a phone base having two microphone signal outlets and two speaker signal outlets, and a handset having two corresponding microphone signal ports and two corresponding speaker signal ports, wherein said telephone handset universal connector comprises:

a universal circuitry having a first electric output for electrically connecting with said four signal outlets of said phone base and a second electric output for electrically connecting with said four signal ports of said handset, wherein said selection circuitry comprises twelve terminal connections as twelve connection combinations respectively to electrically connect said first electric output with said second electric output; and a selection switch electrically connected with said selection circuitry to selectively switch the selection circuitry at one of said terminal connections for correspondingly matching said two microphone signal outlets with said two microphone signal ports respectively and two speaker signal outlets with said two speakers signal ports respectively so as to operatively connect said handset with said phone unit.

2. The telephone handset universal connector, as recited in claim 1, wherein said universal circuitry comprises a polarity check circuit electrically connected between said second electric output and said first electric output for ensuring said two microphone signal outlets being connected with said two microphone signal ports in a polarizing manner at one of said terminal connections.

3. The telephone handset universal connector, as recited in claim 2, wherein said polarity check circuit has a polarity testing terminal and a ground terminal to determine an impedance between said first electric output and said second electric output for testing whether said two microphone signal outlets are polarizedly connected with said microphone signal ports.

4. The telephone handset universal connector, as recited in claim 3, wherein said impedance is about 1000 ohm when said two microphone signal outlets with said two microphone signal ports respectively and two speaker signal outlets with said two speaker signal ports respectively.

5. The telephone handset universal connector, as recited in claim 2, wherein said universal circuitry comprises a circuit indicator electrically connected with said polarity check circuit for generating an indicating signal when said two microphone signal outlets are correspondingly connected with said two microphone signal ports and two speaker signal outlets are correspondingly connected with said two speaker signal ports at said terminal connection.

6. The telephone handset universal connector, as recited in claim 3, wherein said universal circuitry comprises a circuit indicator electrically connected with said polarity check circuit for generating an indicating signal when said two microphone signal outlets are correspondingly connected with said two microphone signal ports and two speaker signal outlets are correspondingly connected with said two speaker signal ports at said terminal connection.

7. The telephone handset universal connector, as recited in claim 4, wherein said universal circuitry comprises a circuit indicator electrically connected with said polarity check circuit for generating an indicating signal when said two microphone signal outlets are correspondingly connected with said two microphone signal ports and two speaker signal outlets are correspondingly connected with said two speaker signal ports at said terminal connection.

8. The telephone handset universal connector, as recited in claim 5, wherein said circuit indicator comprises a LED electrically built-in with said polarity check circuit for generating a light effect as said indicating signal.

9. The telephone handset universal connector, as recited in claim 6, wherein said circuit indicator comprises a LED electrically built-in with said polarity check circuit for generating a light effect as said indicating signal.

10. The telephone handset universal connector, as recited in claim 5, wherein said circuit indicator comprises a sound generator electrically built-in with said polarity check circuit for generating a sound effect as said indicating signal.

11. The telephone handset universal connector, as recited in claim 6, wherein said circuit indicator comprises a sound generator electrically built-in with said polarity check circuit for generating a sound effect as said indicating signal.

12. The telephone handset universal connector, as recited in claim 1, further comprising a portable housing receiving said universal circuitry therein, wherein said selection switch is movably mounted on said portable housing to discretionally move between said twelve discrete positions corresponding to said twelve connection combinations of said universal circuitry to selectively and manually switch said universal circuitry at one of said terminal connections.

13. The telephone handset universal connector, as recited in claim 9, further comprising a portable housing receiving said universal circuitry therein, wherein said selection switch is movably mounted on said portable housing to discretionally move between said twelve discrete positions corresponding to said twelve connection combinations of said universal circuitry to selectively and manually switch said universal circuitry at one of said terminal connections.

14. The telephone handset universal connector, as recited in claim 11, further comprising a portable housing receiving said universal circuitry therein, wherein said selection switch is movably mounted on said portable housing to discretionally move between said twelve discrete positions corresponding to said twelve connection combinations of said universal circuitry to selectively and manually switch said universal circuitry at one of said terminal connections.

15. The telephone handset universal connector, as recited in claim 12, wherein said selection switch comprises a dialing rotor rotatably mounted on said portable housing to electrically connect with said universal circuitry such that said dialing rotor is discretionally rotated between said discrete positions to switch said universal circuitry between said terminal connections.

16. The telephone handset universal connector, as recited in claim 13, wherein said selection switch comprises a dialing rotor rotatably mounted on said portable housing to electrically connect with said universal circuitry such that said dialing rotor is discretionally rotated between said discrete positions to switch said universal circuitry between said terminal connections.

17. The telephone handset universal connector, as recited in claim 14, wherein said selection switch comprises a dialing rotor rotatably mounted on said portable housing to electrically connect with said universal circuitry such that said dialing rotor is discretionally rotated between said discrete positions to switch said universal circuitry between said terminal connections.

18. The telephone handset universal connector, as recited in claim 12, wherein said selection switch comprises slider switch slidably mounted on said portable housing to electrically connect with said universal circuitry such that said slider switch is discretionally slid between said discrete positions to switch said universal circuitry between said terminal connections.

19. The telephone handset universal connector, as recited in claim 13, wherein said selection switch comprises slider switch slidably mounted on said portable housing to electrically connect with said universal circuitry such that said slider switch is discretionally slid between said discrete positions to switch said universal circuitry between said terminal connections.

20. The telephone handset universal connector, as recited in claim 14, wherein said selection switch comprises slider switch slidably mounted on said portable housing to electrically connect with said universal circuitry such that said slider switch is discretionally slid between said discrete positions to switch said universal circuitry between said terminal connections.

\* \* \* \* \*